US011532829B2

(12) United States Patent
Suzuki et al.

(10) Patent No.: US 11,532,829 B2
(45) Date of Patent: Dec. 20, 2022

(54) FUEL CELL PUMP AND METHOD FOR CONTROLLING FUEL CELL PUMP

(71) Applicant: KABUSHIKI KAISHA TOYOTA JIDOSHOKKI, Aichi-ken (JP)

(72) Inventors: Fumihiro Suzuki, Kariya (JP); Tatsushi Mori, Kariya (JP); Yuichi Ishikawa, Kariya (JP); Takumi Kakimoto, Kasugai (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 98 days.

(21) Appl. No.: 17/332,374

(22) Filed: May 27, 2021

(65) Prior Publication Data

US 2021/0384536 A1 Dec. 9, 2021

(30) Foreign Application Priority Data

Jun. 4, 2020 (JP) .............................. JP2020-097709

(51) Int. Cl.
| | |
|---|---|
| *H01M 8/04* | (2016.01) |
| *H01M 8/04858* | (2016.01) |
| *H01M 8/0432* | (2016.01) |
| *H01M 8/04089* | (2016.01) |
| *H01M 8/04225* | (2016.01) |
| *H01M 8/04302* | (2016.01) |

(52) U.S. Cl.
CPC ..... *H01M 8/04917* (2013.01); *H01M 8/0432* (2013.01); *H01M 8/04089* (2013.01); *H01M 8/04225* (2016.02); *H01M 8/04302* (2016.02)

(58) Field of Classification Search
CPC ......... H01M 8/04917; H01M 8/04225; H01M 8/04302; H01M 8/04089; H01M 8/0432
USPC ......................................................... 429/428
See application file for complete search history.

(56) References Cited

U.S. PATENT DOCUMENTS

| | | | |
|---|---|---|---|
| 2011/0212371 A1* | 9/2011 | Itoga ................ | H01M 8/04164 |
| | | | 429/414 |
| 2016/0372768 A1* | 12/2016 | Procter ............ | H01M 8/04529 |
| 2018/0102558 A1* | 4/2018 | Noh ....................... | B60L 58/34 |
| 2018/0114998 A1* | 4/2018 | Kwon ............... | H01M 8/04225 |
| 2018/0323453 A1* | 11/2018 | Arisetty ........... | H01M 8/04365 |
| 2019/0214662 A1* | 7/2019 | Riley ...................... | H01M 8/24 |

FOREIGN PATENT DOCUMENTS

| | | | | |
|---|---|---|---|---|
| JP | 2006-283664 A | | 10/2006 | |
| WO | WO-2004040684 A2 | * | 5/2004 | ........ H01M 8/04089 |

* cited by examiner

*Primary Examiner* — James M Erwin
(74) *Attorney, Agent, or Firm* — Greenblum & Bernstein, P.L.C.

(57) ABSTRACT

A pump for a fuel cell includes a pump portion, a motor, a controller, a housing, and a temperature detector. The controller executes an activation control and a sensorless vector control. In the activation control, the controller executes a cold activation mode process when the outside air temperature is less than or equal to a set temperature. In the cold activation mode process, the controller executes at least one of increasing a value of an activation current supplied to the motor relative to when a normal activation mode process is executed or setting a supply duration of the activation current to the motor to be longer than that of when the normal activation mode process is executed.

9 Claims, 3 Drawing Sheets

FUEL CELL PUMP AND METHOD FOR CONTROLLING FUEL CELL PUMP

BACKGROUND

1. Field

The following description relates to a pump for a fuel cell and a method for controlling a pump for a fuel cell.

2. Description of Related Art

Vehicles having a fuel cell system have recently been in practical use. The fuel cell system includes a fuel cell that generates power by producing a chemical reaction of hydrogen as a fuel gas with oxygen as an oxidant gas that is contained in the air. A pump for a fuel cell is used, for example, as a pump that supplies hydrogen to the fuel cell. Japanese Laid-Open Patent Publication No. 2006-283664 discloses a Roots pump, which is an example of a fuel cell pump. The Roots pump includes a housing, a pump portion that supplies hydrogen to the fuel cell, a pump chamber defined in the housing and accommodating the pump portion, and a motor that drives the pump portion. The Roots pump further includes a controller that controls the driving of the motor. When activating the pump portion, the controller supplies an activation current having a predetermined value to the motor to control the driving of the motor.

In the fuel cell pump, hydrogen that has not reacted with oxygen in the fuel cell (hydrogen off-gas) is drawn into the pump chamber. When hydrogen is drawn into the pump chamber, the pump chamber also draws in water that has been produced as the fuel cell generates power. Thus, for example, when the operation of the pump portion is stopped in a cold environment, the water freezes into ice in the pump chamber. If water freezes into ice between the pump portion and an inner wall of the housing defining the pump chamber, the pump portion may adhere to the housing via the ice.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an objective of the present disclosure to provide an improved pump for a fuel cell and an improved method for controlling a pump for a fuel cell.

To achieve the above objective, a first aspect is a pump for a fuel cell. The pump includes a pump portion configured to supply a fuel gas or an oxidant gas to the fuel cell, a motor configured to drive the pump portion, a controller configured to control driving of the motor, a housing including a pump chamber accommodating the pump portion, a motor chamber accommodating the motor, and a control chamber accommodating the controller, a temperature detector configured to detect an outside air temperature. The controller is configured to execute an activation control that is executed until the pump portion is activated, and a sensorless vector control that is executed after the pump portion is activated. In the activation control, the controller is configured to execute a normal activation mode process when the outside air temperature detected by the temperature detector is greater than a predetermined set temperature, and execute a cold activation mode process when the outside air temperature detected by the temperature detector is less than or equal to the set temperature. In the cold activation mode process, the controller is configured to execute at least one of increasing a value of an activation current supplied to the motor relative to when the normal activation mode process is executed or setting a supply duration of the activation current to the motor to be longer than that of when the normal activation mode process is executed. The controller is configured to shift from the activation control to the sensorless vector control after the pump portion is activated.

To achieve the above objective, a second aspect is a method for controlling a pump for a fuel cell. The pump includes a pump portion configured to supply a fuel gas or an oxidant gas to the fuel cell, a motor configured to drive the pump portion, and a controller configured to control driving of the motor. The method includes an activation control that is executed until the pump portion is activated, and a sensorless vector control that is shifted from the activation control and executed after the pump portion is activated. The activation control includes comparing a predetermined set temperature with an outside air temperature detected by a temperature detector, which detects the outside air temperature, based on a result of the comparison, executing a normal activation mode process when the outside air temperature detected by the temperature detector is greater than the predetermined set temperature, and executing a cold activation mode process when the outside air temperature detected by the temperature detector is less than or equal to the set temperature. The cold activation mode process includes executing at least one of increasing a value of an activation current supplied to the motor relative to when the normal activation mode process is executed or setting a supply duration of the activation current to the motor to be longer than that of when the normal activation mode process is executed.

Other aspects and advantages of the present disclosure will become apparent from the following description, taken in conjunction with the accompanying drawings, illustrating exemplary embodiments.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Embodiments of a fuel cell pump and a method for controlling a fuel cell pump will now be described with reference to FIGS. 1 to 4. The fuel cell pump of the present embodiment is used as a pump configured to supply hydrogen to a fuel cell that generates power by producing a chemical reaction of hydrogen as a fuel gas with oxygen as an oxidant gas contained in the air.

Figure 1:
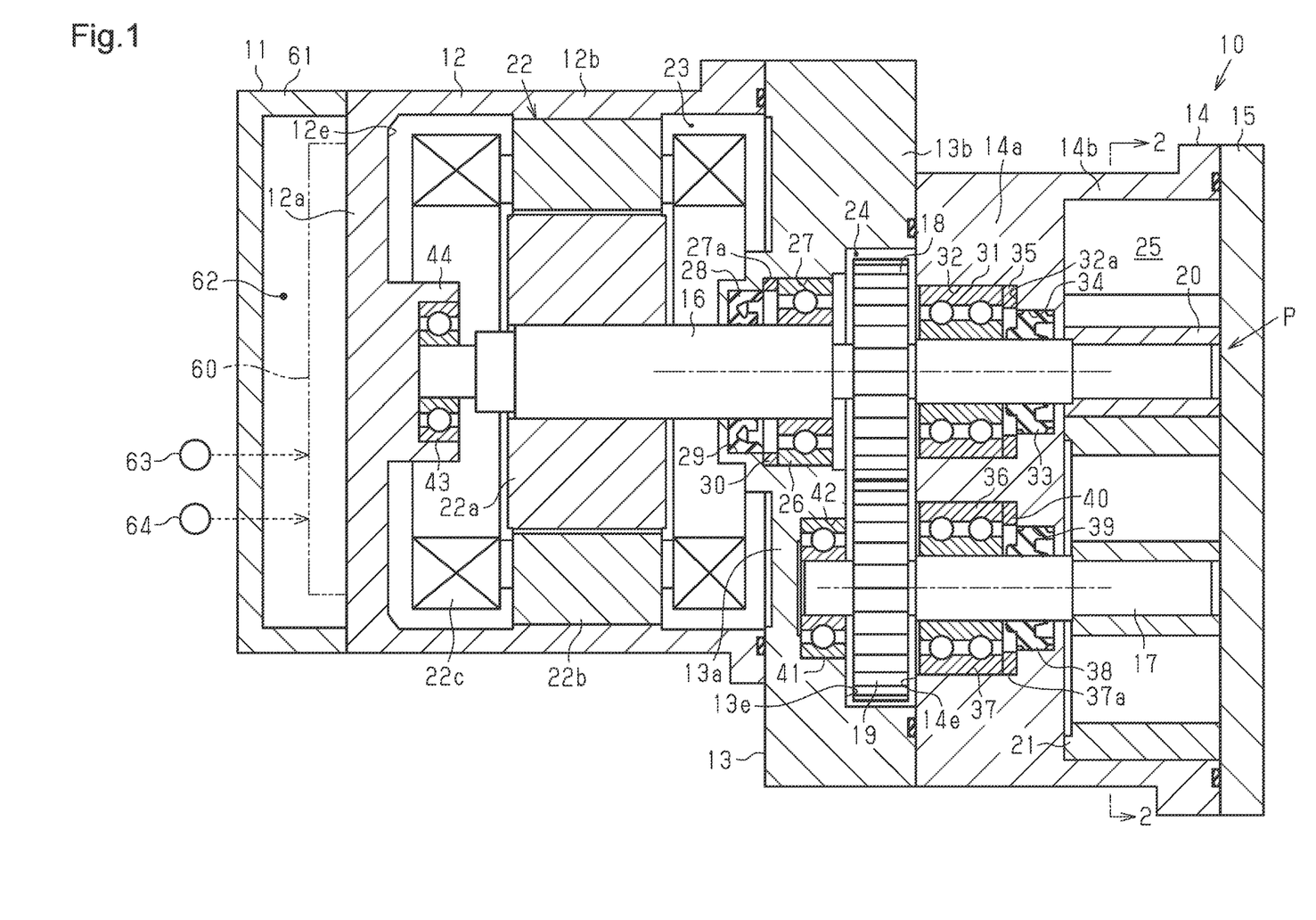
FIG. 1 is a cross-sectional plan view showing an embodiment of a fuel cell pump.

As shown in FIG. 1, a housing 11 of a fuel cell pump 10 is tubular and includes a motor housing 12, a gear housing 13, a rotor housing 14, and a cover member 15. The motor housing 12 includes a flat end wall 12a and a tubular peripheral wall 12b extending from a peripheral portion of the end wall 12a. Thus, the motor housing 12 has the shape of a tube having a closed end. The gear housing 13 includes a flat end wall 13a and a tubular peripheral wall 13b extending from a peripheral portion of the end wall 13a. Thus, the gear housing 13 has the shape of a tube having a closed end. The gear housing 13 is coupled to an open end of the peripheral wall 12b of the motor housing 12. The end wall 13a of the gear housing 13 closes the opening of the peripheral wall 12b of the motor housing 12.

The rotor housing 14 includes a flat end wall 14a and a tubular peripheral wall 14b extending from a peripheral portion of the end wall 14a. Thus, the rotor housing 14 has the shape of a tube having a closed end. The rotor housing 14 is coupled to an open end of the peripheral wall 13b of the gear housing 13. The end wall 14a of the rotor housing 14 closes the opening of the peripheral wall 13b of the gear housing 13. The cover member 15 is flat. The cover member 15 is coupled to an open end of the peripheral wall 14b of the rotor housing 14 and is opposed to the end wall 14a to close the peripheral wall 14b. The axial direction of the peripheral wall 12b of the motor housing 12, the axial direction of the peripheral wall 13b of the gear housing 13, and the axial direction of the peripheral wall 14b of the rotor housing 14 conform to each other.

The fuel cell pump 10 includes a driving shaft 16 and a driven shaft 17 that are disposed parallel to each other and rotationally supported by the housing 11. The rotational axial direction of each of the driving shaft 16 and the driven shaft 17 conforms to the axial direction of each of the peripheral walls 12b, 13b, and 14b. A disc-shaped driving gear 18 is fixed to the driving shaft 16. A disc-shaped driven gear 19 is fixed to the driven shaft 17 and meshes with the driving gear 18. A driving rotor 20 is arranged on the driving shaft 16. A driven rotor 21 is arranged on the driven shaft 17 to mesh with the driving rotor 20.

The fuel cell pump 10 includes a motor 22 that rotates the driving shaft 16 to drive the driving rotor 20 and the driven rotor 21. The motor 22 is accommodated in a motor chamber 23 arranged in the housing 11. The motor chamber 23 is defined by the end wall 12a of the motor housing 12, the peripheral wall 12b of the motor housing 12, and the end wall 13a of the gear housing 13. The motor 22 includes a tubular motor rotor 22a and a tubular stator 22b. The motor rotor 22a is fixed to the driving shaft 16 to rotate integrally with the driving shaft 16. The stator 22b is fixed to an inner surface of the peripheral wall 12b of the motor housing 12 and extends around the motor rotor 22a. The stator 22b includes a coil 22c wound around teeth, which are not illustrated. When power is supplied to the coil 22c, the motor 22 is driven to rotate the motor rotor 22a integrally with the driving shaft 16.

A gear chamber 24 is arranged in the housing 11 to accommodate the driving gear 18 and the driven gear 19. The gear chamber 24 is defined by the end wall 13a of the gear housing 13, the peripheral wall 13b of the gear housing 13, and the end wall 14a of the rotor housing 14. The driving gear 18 and the driven gear 19 mesh with each other and are accommodated in the gear chamber 24. The gear chamber 24 encapsulates oil. The oil lubricates the driving gear 18 and the driven gear 19 and limits increases in the temperature of the driving gear 18 and the driven gear 19. The driving gear 18 and the driven gear 19, which are immersed in the oil, can rotate at a relatively high speed without resulting in galling and wear.

The housing 11 includes a rotor chamber 25, which corresponds to a pump chamber accommodating the driving rotor 20 and the driven rotor 21. The rotor chamber 25 is defined by the end wall 14a of the rotor housing 14, the peripheral wall 14b of the rotor housing 14, and the cover member 15. The driving rotor 20 and the driven rotor 21 mesh with each other and are accommodated in the rotor chamber 25.

The fuel cell pump 10 includes an inverter 60, which corresponds to a controller configured to control the driving of the motor 22. A tubular cover 61 having a closed end is attached to the end wall 12a of the motor housing 12. The end wall 12a of the motor housing 12 and the cover 61 define an inverter chamber 62, which corresponds to a control chamber accommodating the inverter 60. In the present embodiment, the rotor chamber 25, the gear chamber 24, the motor chamber 23, and the inverter chamber 62 are arranged in this order in the rotational axial direction of the driving shaft 16.

The end wall 13a of the gear housing 13 separates the gear chamber 24 and the motor chamber 23 in the rotational axial direction of the driving shaft 16. The end wall 14a of the rotor housing 14 separates the gear chamber 24 and the rotor chamber 25 in the rotational axial direction of the driving shaft 16. The driving shaft 16 extends through the end wall 13a of the gear housing 13 and the end wall 14a of the rotor housing 14. The driven shaft 17 extends through the end wall 14a of the rotor housing 14.

The end wall 13a of the gear housing 13 has an inner surface 13e including a first bearing accommodation recess 27. The first bearing accommodation recess 27 has the shape of a circular hole to accommodate a first bearing 26 that rotationally supports the driving shaft 16. The driving shaft 16 extends through the first bearing accommodation recess 27. The first bearing accommodation recess 27 has a bottom surface 27a including a first seal accommodation recess 29, through which the driving shaft 16 extends. The first seal accommodation recess 29 has the shape of a circular hole to accommodate an annular first seal member 28 that seals the space between the gear chamber 24 and the motor chamber 23. The first seal accommodation recess 29 is in communication with the first bearing accommodation recess 27. In addition, an annular first spacer 30 is arranged between the first bearing 26 and the bottom surface 27a of the first bearing accommodation recess 27 in the rotational axial direction of the driving shaft 16.

The end wall 14a of the rotor housing 14 has an outer surface 14e including a second bearing accommodation recess 32 and a third bearing accommodation recess 37. The second bearing accommodation recess 32 and the third bearing accommodation recess 37 have the shape of a circular hole to accommodate a second bearing 31 and a third bearing 36, which rotationally support the driving shaft 16 and the driven shaft 17, respectively. The driving shaft 16 extends through the second bearing accommodation recess 32. The driven shaft 17 extends through the third bearing accommodation recess 37.

The second bearing accommodation recess 32 has a bottom surface 32a including a second seal accommodation recess 34, through which the driving shaft 16 extends. The second seal accommodation recess 34 has the shape of a circular hole to accommodate an annular second seal member 33 that seals the space between the gear chamber 24 and the rotor chamber 25. The second seal accommodation recess 34 is in communication with the second bearing accommodation recess 32. In addition, an annular second spacer 35 is arranged between the second bearing 31 and the bottom surface 32a of the second bearing accommodation recess 32 in the rotational axial direction of the driving shaft 16.

The third bearing accommodation recess 37 has a bottom surface 37a including a third seal accommodation recess 39, through which the driven shaft 17 extends. The third seal accommodation recess 39 has the shape of a circular hole to accommodate an annular third seal member 38 that seals the space between the gear chamber 24 and the rotor chamber 25. The third seal accommodation recess 39 is in communication with the third bearing accommodation recess 37. In addition, an annular third spacer 40 is arranged between the third bearing 36 and the bottom surface 37a of the third bearing accommodation recess 37 in the rotational axial direction of the driven shaft 17.

The inner surface 13e of the end wall 13a of the gear housing 13 includes a fourth bearing accommodation recess 42 having the shape of a circular hole to accommodate a fourth bearing 41. The fourth bearing 41 rotationally supports an end, that is, a first end, of the driven shaft 17. The fourth bearing accommodation recess 42 has an open edge that is continuous with the inner surface 13e of the end wall 13a of the gear housing 13. The first end of the driven shaft 17 is disposed in the fourth bearing accommodation recess 42 and rotationally supported by the fourth bearing 41. The other end, that is, a second end, of the driven shaft 17 extends through the third bearing accommodation recess 37 and the third seal accommodation recess 39 and projects to the rotor chamber 25. The driven rotor 21 is coupled to the second end of the driven shaft 17. The second end of the driven shaft 17 is a free end. Thus, the driven shaft 17 is supported by the housing 11 in a cantilevered manner.

The end wall 12a of the motor housing 12 has an inner surface 12e including a tubular bearing portion 44. The bearing portion 44 accommodates a fifth bearing 43 rotationally supporting an end, that is, a first end, of the driving shaft 16. The first end of the driving shaft 16 is disposed in the bearing portion 44 and rotationally supported by the fifth bearing 43. The other end, that is, a second end, of the driving shaft 16 extends through the first seal accommodation recess 29, the first bearing accommodation recess 27, the gear chamber 24, the second bearing accommodation recess 32, and the second seal accommodation recess 34 and projects to the rotor chamber 25. The driving rotor 20 is coupled to the second end of the driving shaft 16. The second end of the driving shaft 16 is a free end. Thus, the driving shaft 16 is supported by the housing 11 in a cantilevered manner.

Figure 2:
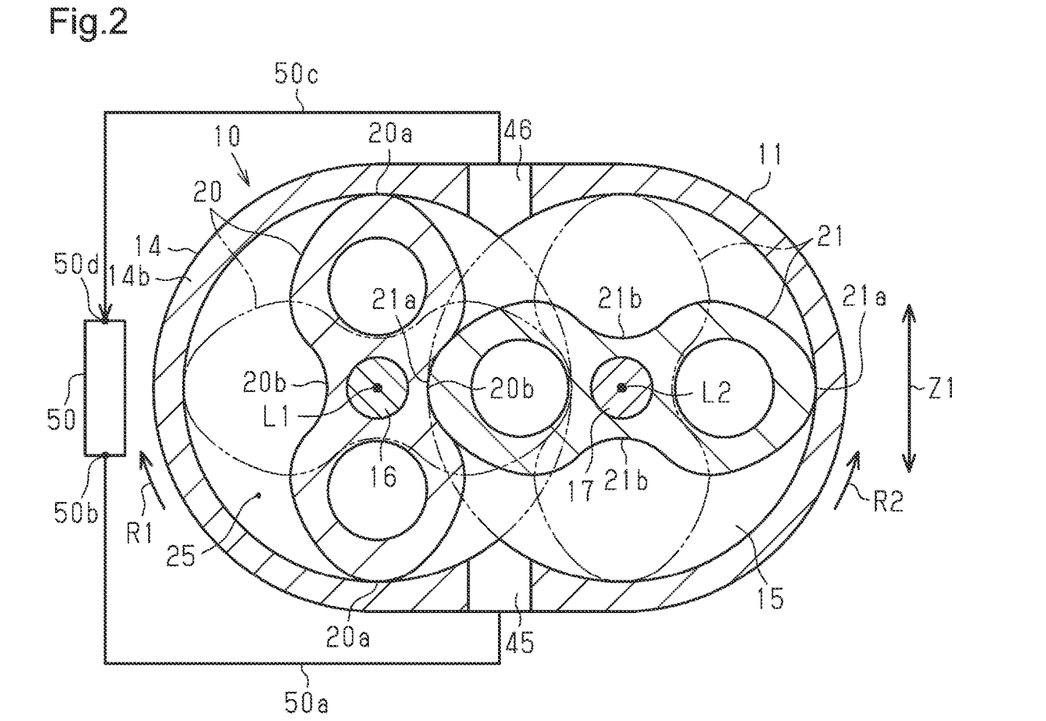
FIG. 2 is a cross-sectional view taken along line 2-2 in FIG. 1.

As shown in FIG. 2, each of the driving rotor 20 and the driven rotor 21 is shaped as a numeral 8 (hourglass-shaped) in a cross-sectional view that is orthogonal to the rotational axial directions of the driving shaft 16 and the driven shaft 17. The driving rotor 20 includes two lobes 20a and recesses 20b located between the two lobes 20a. The driven rotor 21 includes two lobes 21a and recesses 21b located between the two lobes 21a.

The driving rotor 20 and the driven rotor 21 are rotatable in the rotor chamber 25 while repeating engagement of the lobes 20a of the driving rotor 20 with the recesses 21b of the driven rotor 21 and engagement of the recesses 20b of the driving rotor 20 with the lobes 21a of the driven rotor 21. The driving rotor 20 rotates in arrow R1 direction shown in FIG. 2. The driven rotor 21 rotates in arrow R2 direction shown in FIG. 2.

The peripheral wall 14b of the rotor housing 14 includes an intake port 45 in a lower portion in a gravitational direction Z1. The peripheral wall 14b of the rotor housing 14 also includes a discharge port 46 in an upper portion in the gravitational direction Z1. The intake port 45 is connected to a hydrogen outlet 50b of a fuel cell 50 by a first connection pipe 50a. The discharge port 46 is connected to a hydrogen inlet 50d of the fuel cell 50 by a second connection pipe 50c.

As shown in FIGS. 1 and 2, when the motor 22 is driven to rotate the driving shaft 16, the driven shaft 17 rotates in the opposite direction from the driving shaft 16 via the gear coupling of the driving gear 18 and the driven gear 19 that are meshed with each other. Thus, the driving rotor 20 and the driven rotor 21, which are engaged with each other, rotate in opposite directions. In the fuel cell pump 10, when the driving rotor 20 and the driven rotor 21 rotate, hydrogen that has not reacted with oxygen in the fuel cell 50 (hydrogen off-gas) is drawn into the rotor chamber 25 through the hydrogen outlet 50b, the first connection pipe 50a, and the intake port 45. The hydrogen drawn into the rotor chamber 25 is discharged from the discharge port 46 and is supplied to the fuel cell 50 through the second connection pipe 50c and the hydrogen inlet 50d in accordance with the rotation of the driving rotor 20 and the driven rotor 21. Thus, the driving rotor 20 and the driven rotor 21 are configured to be a pump portion P configured to supply hydrogen to the fuel cell 50. The fuel cell pump 10 of the present embodiment is a Roots pump in which the pump portion P includes the driving rotor 20 and the driven rotor 21.

As shown in FIG. 1, the fuel cell pump 10 includes a temperature sensor 63, which corresponds to a temperature detector configured to detect an outside air temperature T1, and a pressure sensor 64 configured to detect a discharge pressure of the fuel cell pump 10. The pressure sensor 64 detects the pressure of hydrogen discharged from the rotor chamber 25 through the discharge port 46 to the second connection pipe 50c by the rotation of the driving rotor 20 and the driven rotor 21. The temperature sensor 63 and the pressure sensor 64 are electrically connected to the inverter 60.

The inverter 60 stores, in advance, a determination program that determines that the pump portion P is activated upon reception of a discharge pressure detection signal from the pressure sensor 64, and determines that the pump portion P is stopped when the discharge pressure detection signal is not received from the pressure sensor 64. The state in which "the pump portion P is stopped" refers to a state in which the driving rotor 20 and the driven rotor 21 are not rotating. The state in which "the pump portion P has started to be activated" refers to a state in which the driving rotor 20 and the driven rotor 21 have started to rotate. The inverter 60 is configured to execute an activation control, which is executed until the pump portion P is activated, and a sensorless vector control, which is executed after the pump portion P is activated.

The inverter 60 receives a signal related to the outside air temperature T1, which is detected by the temperature sensor 63. The inverter 60 stores, in advance, a temperature comparison program that compares the outside air temperature T1 detected by the temperature sensor 63 with a predetermined set temperature T2 based on the signal received from the temperature sensor 63. The inverter 60 stores, in advance, a program that executes a normal activation mode process when the outside air temperature T1 detected by the temperature sensor 63 is greater than the predetermined set temperature T2, and executes a cold activation mode process when the outside air temperature T1 detected by the temperature sensor 63 is less than or equal to the set temperature T2.

When the outside air temperature T1 detected by the temperature sensor 63 is greater than the set temperature T2, it is assumed that water will not freeze in the rotor chamber 25 even if present in the rotor chamber 25. When the outside air temperature T1 detected by the temperature sensor 63 is less than or equal to the set temperature T2, it is assumed that water is frozen in the rotor chamber 25 if present in the rotor chamber 25. Such assumptions are obtained in advance by tests or the like. Thus, the set temperature T2 is a temperature that is obtained in advance by tests or the like for determining whether water is frozen in the rotor chamber 25 when present in the rotor chamber 25.

The inverter 60 stores, in advance, a program that supplies an activation current, which is the minimum value of the activation current to activate the pump portion P, to the motor 22 for the minimum amount of time when the normal activation mode process is executed. The period of the activation current during the normal activation mode process is invariably set to be fixed.

The inverter 60 stores, in advance, a program that increases the value of the activation current supplied to the motor 22 when the cold activation mode process is executed relative to when the normal activation mode process is executed, and also sets a supply duration of the activation current to the motor 22 to be longer when the cold activation mode process is executed than when the normal activation mode process is executed. The inverter 60 executes this program to perform the activation control on the pump portion P. More specifically, for example, when the cold activation mode process is executed, the inverter 60 supplies the motor 22 with the activation current having a value that is approximately twice the value of the activation current that is supplied to the motor 22 when the normal activation mode process is executed. In addition, for example, when the cold activation mode process is executed, the inverter 60 sets the supply duration of the activation current to the motor 22 to be ten times longer than the supply duration of the activation current to the motor 22 when the normal activation mode process is executed.

Figure 3:
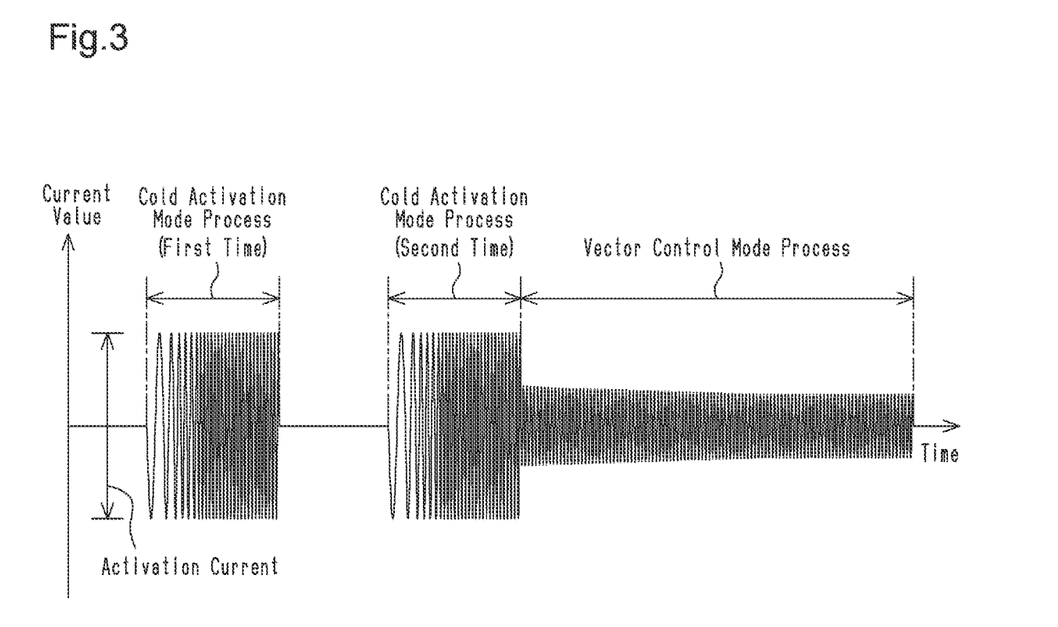
FIG. 3 is a graph showing the relationship between current and time when a cold activation mode process is executed to activate a pump portion.

As shown in FIG. 3, the inverter 60 stores, in advance, a program that executes the cold activation mode process multiple times. For example, when the cold activation mode process is executed for the first time and the discharge pressure detection signal is not received from the pressure sensor 64, the inverter 60 determines that the pump portion P is stopped, that is, the pump portion P has not been activated, and executes the cold activation mode process again.

The inverter 60 stores, in advance, a program that gradually shortens the period of the activation current during the cold activation mode process. The period of the activation current is set so as to gradually shorten during the cold activation mode process.

The inverter 60 stores, in advance, a program that executes a vector control mode process, which performs a sensorless vector control on the motor 22, when the discharge pressure detection signal is received from the pressure sensor 64 and it is determined that the pump portion P has started to be activated. The inverter 60 executes this program to perform the sensorless vector control on the motor 22.

In addition, the inverter 60 stores, in advance, a program that executes an abnormality determination process that determines an abnormality has occurred when the discharge pressure detection signal is not received from the pressure sensor 64 after the normal activation mode process is executed.

The operation of the present embodiment will now be described along the description of a method for controlling the fuel cell pump 10 in the present embodiment. The inverter 60 executes the activation control, which is executed until the pump portion P is activated, and the sensorless vector control, which is shifted from the activation control and executed after the pump portion P is activated.

Figure 4:
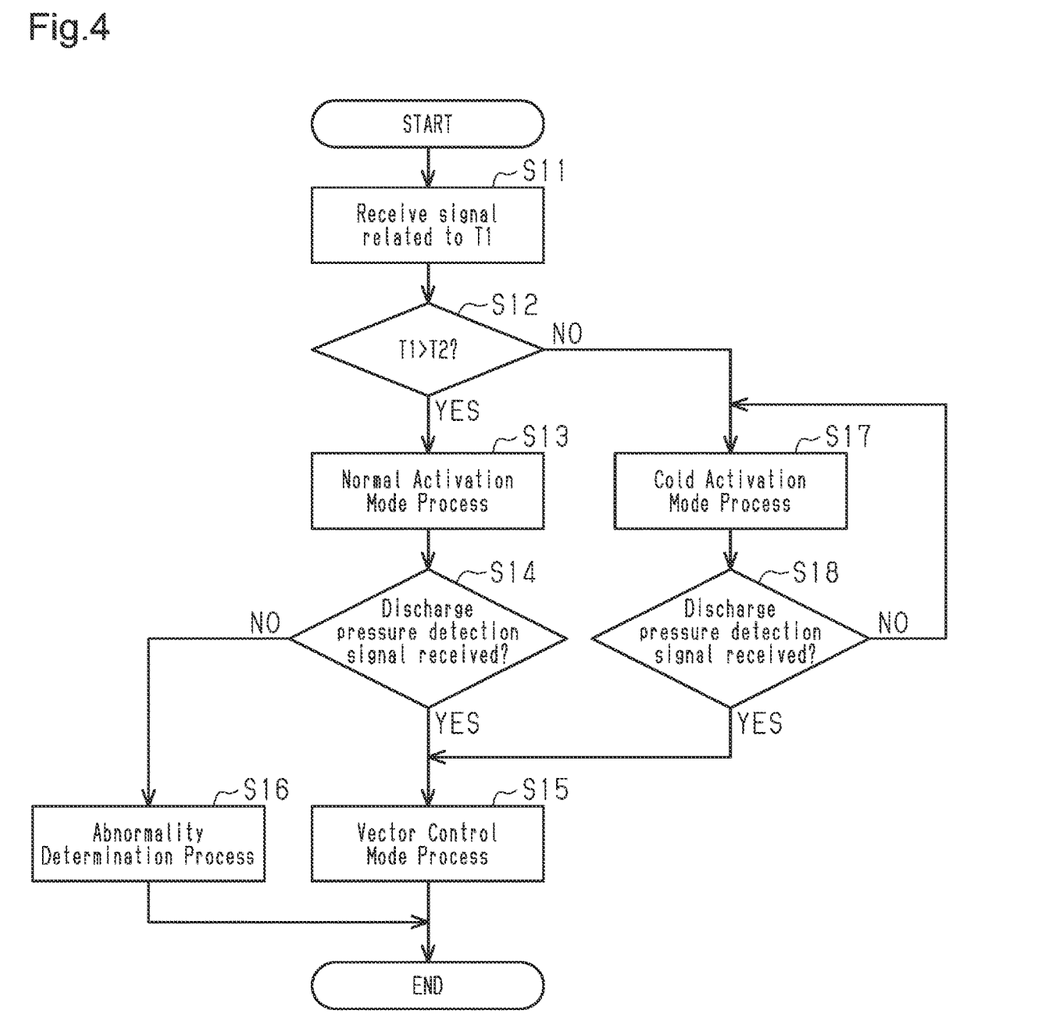
FIG. 4 is a flowchart illustrating the controlling of an inverter.

As shown in FIG. 4, to activate the pump portion P, in step S11, the inverter 60 receives a signal related to the outside air temperature T1 detected by the temperature sensor 63. In step S12, the inverter 60 executes a temperature comparison step that compares the outside air temperature T1 detected by the temperature sensor 63 with the predetermined set temperature T2 based on the signal received from the temperature sensor 63.

If the comparison result of the temperature comparison step executed in step S12 shows that the outside air temperature T1 detected by the temperature sensor 63 is greater than the set temperature, the inverter 60 proceeds to step S13 and executes a process execution step that executes the normal activation mode process in step S13. Thus, the inverter 60 supplies the activation current, which is the minimum value of the activation current to activate the pump portion P, to the motor 22 for the minimum amount of time. At this time, the period of the activation current is invariably fixed. In step S14, the inverter 60 determines whether the discharge pressure detection signal is received from the pressure sensor 64. If it is determined in step S14 that the discharge pressure detection signal has been received from the pressure sensor 64, the inverter 60 proceeds to the normal control in step S15. The inverter 60 determines that the pump portion P has started to be activated and executes, in step S15, a vector control mode process that performs sensorless vector control on the motor 22. If it is determined in step S14 that the discharge pressure detection signal has not been received from the pressure sensor 64, the inverter 60 proceeds to step S16 and executes the abnormality determination process based on determination that an abnormality has been detected.

In the fuel cell pump 10, hydrogen that has not reacted with oxygen in the fuel cell 50 (hydrogen off-gas) is drawn into the rotor chamber 25. Water that has been produced as a result of power generation of the fuel cell 50 generates power is also drawn into the rotor chamber 25. Thus, for example, when the operation of the pump portion P is stopped in a cold environment, the water freezes into ice in the rotor chamber 25. In the rotor chamber 25, if water is frozen into ice between the inner surface of the motor housing 12 defining the rotor chamber 25 and the driving rotor 20 and the driven rotor 21, the driving rotor 20 and the driven rotor 21 may be adhered to the rotor housing 14 by the ice.

If the comparison result of the temperature comparison step executed in step S12 shows that the outside air temperature T1 detected by the temperature sensor 63 is less than or equal to the set temperature T2, the inverter 60 proceeds to step S17. In step S17, the inverter 60 executes a process execution step that executes the cold activation mode process. As a result, the value of the activation current supplied to the motor 22 is increased relative to when the normal activation mode process is executed. Also, the supply duration of the activation current to the motor 22 is increased relative to when the normal activation mode process is executed. That is, the maximum value of the activation current in the cold activation mode process is greater than the maximum value of the activation current in the normal activation mode process.

In addition, in this case, the inverter 60 gradually shortens the period of the activation current, which is different from the period of the activation current when the normal activation mode process is executed. For example, as the outside air temperature T1 detected by the temperature sensor 63 becomes lower than the set temperature T2, it is likely that the driving rotor 20 and the driven rotor 21 are more strongly adhered to the rotor housing 14. In such a case, when the motor 22 starts to rotate at a low speed, the driving rotor 20 and the driven rotor 21 are separated from the ice present between the inner wall of the rotor housing 14 and the driving rotor 20 and the driven rotor 21 more readily than when the motor 22 quickly starts to rotate at a high speed.

In step S17, when the cold activation mode process is executed for the first time, the inverter 60 proceeds to step S18 and determines in step S18 whether the discharge pressure detection signal has been received from the pressure sensor 64. In step S18, if it is determined that the discharge pressure detection signal has not been received from the pressure sensor 64, the inverter 60 proceeds to step S17 and executes the cold activation mode process for the second time. Thus, when the cold activation mode process is executed for the first time and the discharge pressure detection signal has not been received from the pressure sensor 64, the inverter 60 determines that the pump portion P is stopped, that is, the pump portion P has not been activated, and again executes the cold activation mode process.

When the inverter 60 executes the cold activation mode process for the second time, the switching of the rotation direction of the motor 22 generates impact force, which is transferred to the ice present between the inner surface of the motor housing 12 defining the rotor chamber 25 and the driving rotor 20 and the driven rotor 21. As a result, the driving rotor 20 and the driven rotor 21 are separated from the ice present between the inner surface of the motor housing 12 and the driving rotor 20 and the driven rotor 21, and the driving rotor 20 and the driven rotor 21 start to rotate. If it is determined in step S18 that the discharge pressure detection signal has been received from the pressure sensor 64, the inverter 60 proceeds to the normal control in step S15. The inverter 60 determines that the pump portion P has started to be activated and executes, in step S15, the vector control mode process that performs sensorless vector control on the motor 22.

In the present embodiment, the pump portion P is activated when the cold activation mode process is executed twice. If the pump portion P is not activated when the cold activation mode process is executed twice, the inverter 60 repeatedly executes the process from step S17.

Thus, the activation control includes steps S11, S12, S13, S14, S17, and S18. The sensorless vector control includes step S15.

To facilitate the understanding of the effects of the present embodiment, the conventional fuel cell pump described in the Background section will be referred to.

As described in the Background section, the pump portion may be adhered to the housing by ice in a cold environment. The controller may be configured to invariably supply a predetermined value of the activation current to the motor to activate the pump portion without taking into consideration whether the pump portion is adhered to the housing by ice. In this configuration, for example, when the pump portion is adhered to the housing by ice, it takes a longer time to activate the pump portion than when the pump portion is not adhered to the housing by ice. This lowers responsiveness.

In this respect, the controller may be configured to invariably supply the motor, to activate the pump portion, with the activation current having a value such that the pump portion is immediately drivable even when the pump portion is adhered to the housing by ice. In this configuration, for example, even when the pump portion is not adhered to the housing by ice, the controller supplies the motor with the activation current having a value such that the pump portion that is adhered to the housing by ice is drivable. Thus, the activation current has an overly large value and is supplied to the motor. This results in unnecessary power consumption.

The present embodiment has the following advantages.

(1) When the outside air temperature T1 detected by the temperature sensor 63 is less than or equal to the set temperature T2, the inverter 60 executes the cold activation mode process. That is, for example, even when the driving rotor 20 and the driven rotor 21 are adhered to the rotor housing 14 by ice, the following two actions are both executed to activate the pump portion P. The two actions are increasing the value of the activation current supplied to the motor 22 relative to when the normal activation mode process is executed and setting the supply duration of the activation current to the motor 22 to be longer than that of when the normal activation mode process is executed. This avoids a situation in which, for example, the inverter 60 executes the normal activation mode process to activate the pump portion P regardless of the driving rotor 20 and the driven rotor 21 being adhered to the rotor housing 14 by ice. As a result, the time for activating the pump portion is shortened.

When the outside air temperature T1 detected by the temperature sensor 63 is greater than the predetermined set temperature T2, the inverter 60 executes the normal activation mode process. This avoids a situation in which, for example, at least one of increasing the value of the activation current supplied to the motor 22 relative to when the normal activation mode process is executed or setting the supply duration of the activation current to the motor 22 to be longer than that of when the normal activation mode process is executed, as in the cold activation mode process, is executed to activate the pump portion P regardless of the driving rotor 20 and the driven rotor 21 not being adhered to the rotor housing 14 by ice. As a result, the supply of the activation current having an excessive value to the motor 22 and an unnecessary extension of the supply duration of the activation current to the motor 22 are avoided. This reduces unnecessary power consumption. As described above, while shortening the time for activating the pump portion P, unnecessary power consumption is reduced.

(2) The pump portion P is activated further readily as compared to, for example, a configuration that executes only one of increasing the value of the activation current to the motor 22 or setting the supply duration of the activation current to the motor 22 to be longer than that of when the normal activation mode process is executed.

(3) For example, when the inverter 60 executes the cold activation mode process for the first time and the pump portion P is not activated, the inverter 60 again executes the cold activation mode process. In this case, impact force is generated by the switching of the rotation direction of the motor 22 is transmitted to the ice present between the inner surface of the rotor housing 14 defining the rotor chamber 25 and the driving rotor 20 and the driven rotor 21. This facilitates the separation of the driving rotor 20 and the driven rotor 21 from the ice present between the inner surface of the rotor housing 14 and the driving rotor 20 and the driven rotor 21, thereby allowing the pump portion P to be readily activated.

(4) For example, as the outside air temperature T1 detected by the temperature sensor 63 becomes lower than the set temperature T2, it is likely that the driving rotor 20 and the driven rotor 21 are more strongly adhered to the rotor housing 14. In such a case, when the motor 22 starts to rotate at a low speed, the driving rotor 20 and the driven rotor 21 are separated from the ice present between the inner wall of the rotor housing 14 and the driving rotor 20 and the driven rotor 21 more readily than when the motor 22 quickly starts to rotate at a high speed. The inverter 60 gradually shortens the period of the activation current during the cold activation mode process. In this configuration, the motor 22 starts to rotate at a lower speed than in a configuration in which the period of activation current is invariably fixed. This allows for the separation of the driving rotor 20 and the driven rotor 21 from ice present between the inner surface of the rotor housing 14 and the driving rotor 20 and the driven rotor 21 even when the driving rotor 20 and the driven rotor 21 are strongly adhered to the rotor housing 14 by the ice. Thus, the pump portion P is readily activated.

The above embodiment may be modified as described below. The embodiment and the following modified examples may be combined as long as the combined modified examples remain technically consistent with each other.

In the embodiment, in the cold activation mode process, the inverter 60 may execute only one of increasing the value of the activation current supplied to the motor 22 relative to when the normal activation mode process is executed or setting the supply duration of the activation current to the motor 22 to be longer than that of when the normal activation mode process is executed. More specifically, in the cold activation mode process, the inverter 60 may execute at least one of increasing the value of the activation current supplied to the motor 22 relative to when the normal activation mode process is executed or setting the supply duration of the activation current to the motor 22 to be longer than that of when the normal activation mode process is executed.

In the embodiment, the inverter 60 may execute control such that the supply duration of the activation current is set so as to extend in accordance with increases in the number of times the cold activation mode process is executed. For example, as the outside air temperature T1 detected by the temperature sensor 63 becomes lower than the set temperature T2, it is likely that the driving rotor 20 and the driven rotor 21 are more strongly adhered to the rotor housing 14. In such a case, the pump portion P may not be activated by the cold activation mode process executed only one time by the inverter 60. In this regard, the inverter 60 may set the supply duration of the activation current so as to extend in accordance with increases in the number of times the cold activation mode process is executed. In this configuration, the pump portion P may be activated with a fewer number of times of execution of the cold activation mode process, for example, as compared to a configuration in which the inverter 60 invariably sets the supply duration of activation current to be fixed regardless of increases in the number of times of execution of the cold activation mode process. This reduces unnecessary power consumption while shortening the time for activating the pump portion P.

In addition, when the supply duration of the activation current is set to one second, two seconds, and three seconds respectively for the first to third times of the cold activation mode process and the pump portion P is activated by the third time of the cold activation mode process, the activation time is shorter than, for example, when the supply duration of the activation current is invariably set to three seconds and the pump portion P is activated by the third time of the cold activation mode process.

In the embodiment, the inverter 60 may execute control such that the supply duration of the activation current is set so as to shorten in accordance with increases in the number of times the cold activation mode process is executed, and such that the set supply duration of the activation current is longer than the supply duration of the activation current when the normal activation mode process is executed. For example, when the outside air temperature T1 detected by the temperature sensor 63 is less than or equal to the set temperature T2, as the outside air temperature T1 detected by the temperature sensor 63 becomes closer to the set temperature T2, it is highly likely that the driving rotor 20 and the driven rotor 21 are not so strongly adhered to the rotor housing 14 by ice. In such a case, when the inverter 60 executes the cold activation mode process a few times, it is highly likely that the pump portion P immediately starts to be activated. In this regard, the inverter 60 may set the supply duration of the activation current so as to shorten in accordance with increases in the number of times the cold activation mode process is executed. This configuration minimizes the time for which the inverter 60 supplies unnecessary activation current to the motor 22 after the driving rotor 20 and the driven rotor 21 are separated from the ice present between the inner wall of the rotor housing 14 and the driving rotor 20 and the driven rotor 21, for example, as compared to a configuration in which the inverter 60 invariably supplies the activation current for a fixed duration regardless of increases in the number of times the cold activation mode process is executed. This reduces unnecessary power consumption.

In addition, when the supply duration of the activation current is set to one second, two seconds, and three seconds respectively for the first to third times of the activation control and the pump portion P is activated by the third time of the activation control, the activation time is shorter than, for example, when the supply duration of the activation current is invariably set to three seconds and the pump portion P is activated by the third time of the activation control.

In the embodiment, the period of the activation current may be set so as to gradually extend during the cold activation mode process. For example, when the outside air temperature T1 detected by the temperature sensor 63 is less than or equal to the set temperature T2, as the outside air temperature T1 detected by the temperature sensor 63 becomes closer to the set temperature T2, it is highly likely that the driving rotor 20 and the driven rotor 21 are not so strongly adhered to the rotor housing 14 by ice. In such a case, even when the motor 22 quickly starts to rotate at a high speed, the driving rotor 20 and the driven rotor 21 are adequately separated from the ice present between the inner wall of the rotor housing 14 and the driving rotor 20 and the driven rotor 21. In this regard, the inverter 60 gradually extends the period of the activation current during the cold activation mode process. In this configuration, the motor 22 quickly starts to rotate at a high speed as compared to in a configuration in which the period of the activation current is invariably fixed. Thus, when the driving rotor 20 and the driven rotor 21 are adhered to the rotor housing 14 by ice with relatively low strength, the driving rotor 20 and the driven rotor 21 are readily separated from ice present between the inner wall of the rotor housing 14 and the driving rotor 20 and the driven rotor 21. Although the inverter 60 supplies the activation current to the motor 22 even after the separation of the driving rotor 20 and the driven rotor 21 from the ice present between the inner wall of the rotor housing 14 and the driving rotor 20 and the driven rotor 21, unnecessary power consumption is reduced since the inverter 60 gradually extends the period of the activation current during the cold activation mode process.

In the embodiment, the values of the activation current, the lengths of the supply duration of the activation current, and the lengths of the period of the activation current during the cold activation mode process may be combined with one another. More specifically, any setting may be used as long as the time for activating the pump portion P is shortened or unnecessary power consumption is reduced as compared to when the value and the supply duration of the activation current are invariably set to be fixed.

In the embodiment, the fuel cell pump is used as a pump that supplies hydrogen to a fuel cell that generates power by producing a chemical reaction of hydrogen as a fuel gas with oxygen as an oxidant gas contained in the air. Instead, the fuel cell pump may be a pump that supplies air to the fuel cell.

In the embodiment, the fuel cell pump 10 is a Roots pump in which the pump portion P includes the driving rotor 20 and the driven rotor 21. Instead, the pump portion P may be, for example, a cascade pump or a centrifugal pump using impellers. More specifically, the fuel cell pump 10 may have any configuration in which the pump portion P supplies the fuel cell 50 with hydrogen as fuel gas, air as an oxidant gas, or the like.

In the embodiment, the temperature sensor 63 detects the outside air temperature T1. Instead, for example, the temperature sensor 63 may detect the temperature of the rotor chamber 25 to estimate the outside air temperature T1. More specifically, any configuration for estimating the temperature environment of the outside of the fuel cell pump 10 may be used.

In the embodiment, the pressure sensor 64 determines whether the pump portion P is activated. Instead, the configuration may include a torque sensor that detects the torque of the motor 22 or the like. More specifically, the configuration may include any detector that detects a change between before and after activation of the pump portion P.

In the embodiment, the pressure sensor 64 determines whether the pump portion P is activated. However, steps S14 and S18 executed by the pressure sensor 64 may be omitted. That is, in step S13 shown in FIG. 4, if the process fails to proceed from step S13 to step S15, step S13 may be retried. Also, in step S17 shown in FIG. 4, if the process fails to proceed from step S17 to step S15, step S17 may be retried.

In the embodiment, the driving rotor 20 and the driven rotor 21 may be shaped, for example, as three lobes or four lobes in a cross-sectional view that is orthogonal to the rotational axial directions of the driving shaft 16 and the driven shaft 17.

In the embodiment, the driving rotor 20 and the driven rotor 21 may be, for example, helical.

The inverter 60 may be configured to be circuitry including one or more processors that execute various processes in accordance with a computer program (software). The inverter 60 may be configured to be circuitry including one or more dedicated hardware circuits such as an application specific integrated circuit (ASIC) that execute at least some of the various processes or circuitry including a combination of the one or more processors and the one or more dedicated hardware circuits, which are described above. The processors include a CPU and memory such as RAM and ROM. The memory, that is, a non-transitory computer readable storage medium, stores program codes or instructions configured to cause the CPU to execute processes. The memory includes any type of medium that is accessible by a general-purpose computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A pump for a fuel cell, the pump comprising:
   a pump portion configured to supply a fuel gas or an oxidant gas to the fuel cell;
   a motor configured to drive the pump portion;
   a controller configured to control driving of the motor;
   a housing including a pump chamber accommodating the pump portion, a motor chamber accommodating the motor, and a control chamber accommodating the controller; and
   a temperature detector configured to detect an outside air temperature, wherein
   the controller is configured to execute an activation control that is executed until the pump portion is activated, and a sensorless vector control that is executed after the pump portion is activated,
   in the activation control, the controller is configured to execute a normal activation mode process when the outside air temperature detected by the temperature detector is greater than a predetermined set temperature, and execute a cold activation mode process when the outside air temperature detected by the temperature detector is less than or equal to the set temperature,
   in the cold activation mode process, the controller is configured to execute at least one of increasing a value of an activation current supplied to the motor relative to when the normal activation mode process is executed or setting a supply duration of the activation current to the motor to be longer than that of when the normal activation mode process is executed, and the controller is configured to shift from the activation control to the sensorless vector control after the pump portion is activated.

2. The pump according to claim 1, wherein
the cold activation mode process includes
increasing the value of the activation current supplied to the motor relative to when the normal activation mode process is executed, and
setting the supply duration of the activation current to the motor to be longer than that of when the normal activation mode process is executed, and
a maximum of the value of the activation current in the cold activation mode process is greater than a maximum of the value of the activation current in the normal activation mode process.

3. The pump according to claim 1, wherein the cold activation mode process is executed multiple times.

4. The pump according to claim 3, wherein the controller is configured to set the supply duration of the activation current so as to extend in accordance with increases in the number of times that the cold activation mode process is executed.

5. The pump according to claim 3, wherein
the controller is configured to set the supply duration of the activation current so as to shorten in accordance with increases in the number of times the cold activation mode process is executed, and
the set supply duration of the activation current is longer than a supply duration of the activation current when the normal activation mode process is executed.

6. The pump according to claim 1, wherein the controller is configured to gradually shorten a period of the activation current during the cold activation mode process.

7. The pump according to claim 1, wherein the controller is configured to gradually extend a period of the activation current during the cold activation mode process.

8. A method for controlling a pump for a fuel cell, wherein the pump includes a pump portion configured to supply a fuel gas or an oxidant gas to the fuel cell, a motor configured to drive the pump portion, and a controller configured to control driving of the motor, the method comprising:

an activation control that is executed until the pump portion is activated; and
a sensorless vector control that is shifted from the activation control and executed after the pump portion is activated, wherein
the activation control includes
comparing a predetermined set temperature with an outside air temperature detected by a temperature detector, which detects the outside air temperature,
based on a result of the comparison, executing a normal activation mode process when the outside air temperature detected by the temperature detector is greater than the predetermined set temperature, and
executing a cold activation mode process when the outside air temperature detected by the temperature detector is less than or equal to the set temperature, and
the cold activation mode process includes executing at least one of increasing a value of an activation current supplied to the motor relative to when the normal activation mode process is executed or setting a supply duration of the activation current to the motor to be longer than that of when the normal activation mode process is executed.

9. The method according to claim 8, wherein
the cold activation mode process includes
increasing the value of the activation current supplied to the motor relative to when the normal activation mode process is executed, and
setting the supply duration of the activation current to the motor to be longer than that of when the normal activation mode process is executed,
a maximum of the value of the activation current in the cold activation mode process is greater than a maximum of the value of the activation current in the normal activation mode process, and
the cold activation mode process is executed multiple times.

* * * * *